Apr. 3, 1923.

H. E. WARREN

SYSTEM FOR REGULATING FREQUENCY

Filed Dec. 13, 1918

1,450,620

Inventor:
Henry E. Warren
By Jas. H. Churchill
Atty.

Patented Apr. 3, 1923.

1,450,620

UNITED STATES PATENT OFFICE.

HENRY E. WARREN, OF ASHLAND, MASSACHUSETTS, ASSIGNOR TO WARREN CLOCK COMPANY, OF ASHLAND, MASSACHUSETTS, A CORPORATION OF MAINE.

SYSTEM FOR REGULATING FREQUENCY.

Application filed December 13, 1918. Serial No. 266,520.

*To all whom it may concern:*

Be it known that I, HENRY E. WARREN, a citizen of the United States, residing in Ashland, in the county of Middlesex and State of Massachusetts, have invented an Improvement in Systems for Regulating Frequency, of which the following description, in connection with the accompanying drawings, is a specification, like characters on the drawings representing like parts.

This invention relates to an electrical system in which an electric circuit is provided with a circuit controller operated by a synchronous motor and with a second circuit controller operated by a device working in conjunction with said synchronous motor to govern said circuit.

The electrical system is especially adapted for determining or controlling the frequency of an alternating current, and to this end the synchronous motor is connected with an alternating current circuit whose frequency is to be controlled, and the device actuating the second circuit controller may and preferably will be a clock or standard time keeper, which is designed to run at exactly the same speed as the synchronous motor and have the same phase relations, so that, when the frequency of the alternating current is normal, the circuit controllers operated by the clock and motor have one relation to each other and to the electric circuit governed by them, and when the frequency varies, the said circuit controllers have another relation to each other and to the electric circuit governed by them. This variation in the relation of the circuit controllers may be utilized to change the condition of the electric circuit governed by them, and preferably to give a signal that such change in the frequency has taken place.

It is preferred to provide for a change in opposite directions from the normal, that is, so as to give a signal indicative of an increase in the frequency, and another signal indicative of a decrease in the frequency.

These and other features of this invention will be pointed out in the claims at the end of this specification.

Figure 1:
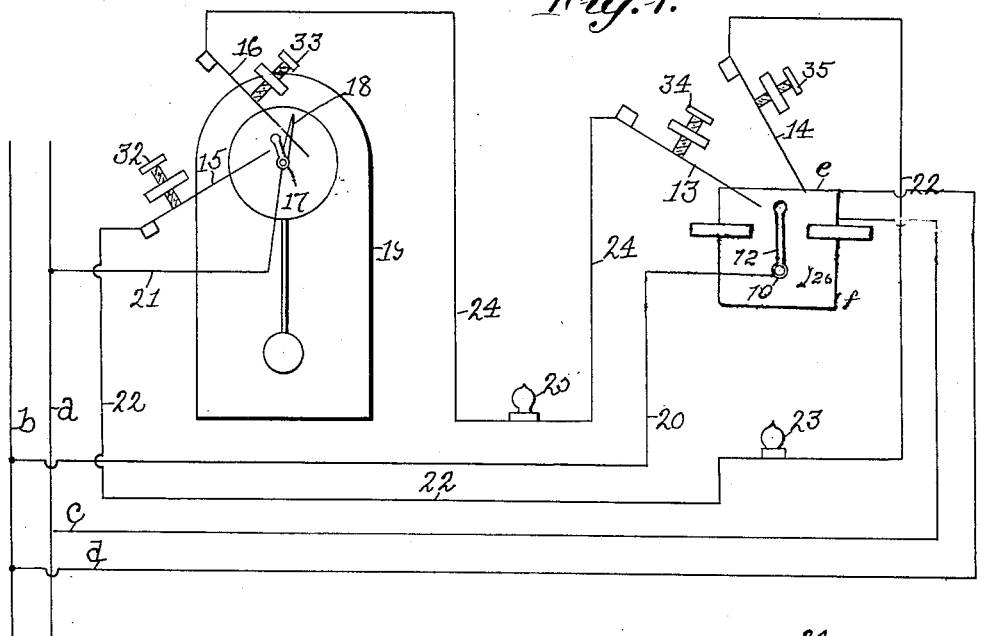
Figure 2:
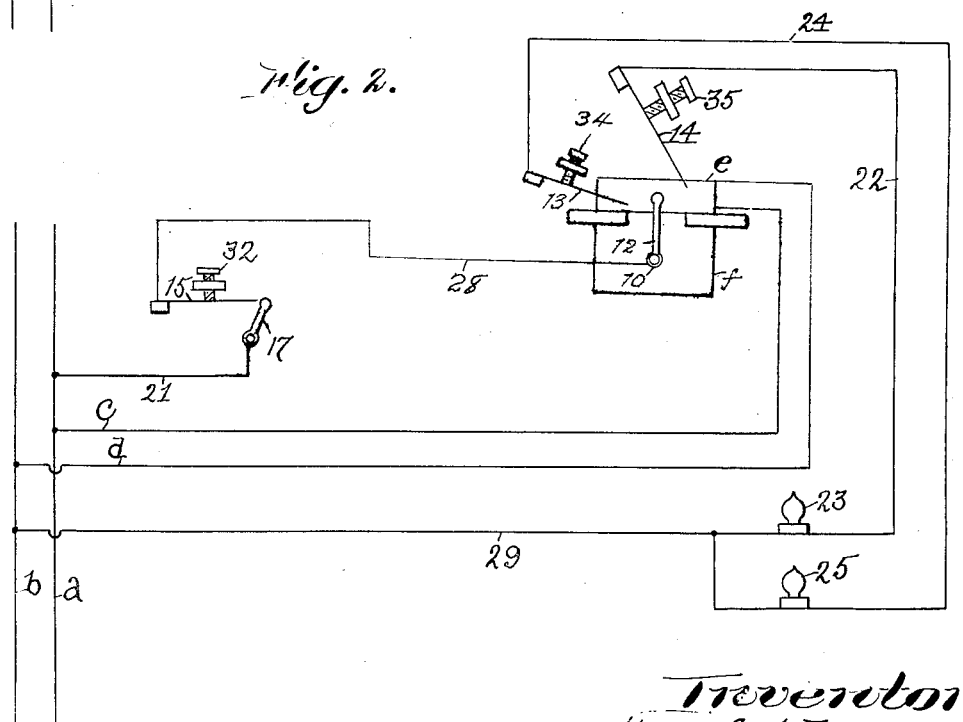

Fig. 1 represents in diagram one arrangement of an electrical system embodying this invention, and Fig. 2, a modified arrangement of the system.

Referring to the drawing *a*, *b* represent the line wires of a circuit supplied with alternating current whose frequency it is desired to determine or control.

In accordance with this invention, the alternating current circuit *a*, *b*, has connected with it by wires *c*, *d*, the field magnet *e* of a synchronous motor *f*, which may be of any suitable or desired construction, and whose rotor represented by the shaft 10 has fast on it an arm 12, which, as herein-shown constitutes the movable member of a plurality of circuit controllers, whose co-operating members are shown as contact arms or brushes 13, 14, which are included in circuit with brushes or contact members 15, 16, of circuit controllers having a common co-operating member, herein shown as an arm 17 connected with the second hand 18 of a standard time keeper or clock 19 of any desired or known construction. As shown in Fig. 1, the contact member 12, which is rotated by the synchronous motor *f*, is connected by the wire 20 with one line wire as *b*, and the contact member 17 which is rotated by the standard time keeper 19, is connected by the wire 21 with the other line wire *a*.

The brushes 14, 15, are connected by wire 22 which includes an indicating device, which is herein represented as an electric lamp 23, and the brushes 13, 16, are connected by wire 24 which includes an indicating device 25.

The contact brushes 13, 14, are arranged with respect to the movable contact member 12, so as to be engaged in sequence by the contact member 12 for a time interval which may be regulated but with a period between said engagements, when the contact member 12 is rotated in the direction of the arrow 26, and the contact brushes 15, 16, are similarly arranged with relation to the movable contact member 17.

The circuits are so arranged that the current flows from the line wire *a* through wire 21 to the revolving clock contact member 17, and thence to the brush 15 or 16, passing from 15 through wire 22 and lamp 23 to contact brush 14, or from contact brush 16 by wire 24 and lamp 25 to contact brush 13.

If the hand 18 and its attached contact member 17, and the contact member 12 of the synchronous motor are revolving at exactly the same speed and have exactly the same phase relations, the circuit of the indicator 23 will be closed at the clock by the member 17 engaging the contact brush 15, when the same circuit is open at the motor between the member 12 and contact brush 14, and said circuit will later be closed between the member 12 and brush 14, when it is open at the clock between the brush 15 and contact member 17, and when both circuits of the brushes 15, 16, are open, both circuits of brushes 13, 14, will also be open. If now, the speed of the synchronous motor $f$ increases slightly beyond the speed of the revolving hand 18 of the clock, the phase relations will change and the contact member 12 will reach contact member or brush 14 before the contact member 17 leaves the contact brush or member 15. Consequently the circuit including the indicating device or lamp 23 will be closed and for a short time current will flow through the lamp 23, which becoming illuminated will call the attention of the operator to the fact that the frequency of the alternating current is higher than its normal value. The circuit through the lamp 23 may be traced as follows: from the line wire $a$ by wire 21 to contact members 17, 15, of the clock, thence by wire 22 and lamp 23 to contact members 14, 12, of the motor $f$, thence by wire 20 to line wire $b$.

If the frequency remains high, the duration of the periodic impulse through the lamp 23 will keep increasing and will reach a maximum when the duration and phase relation of the contact between contact members 17, 15, and contact members 14, 12, correspond.

Conversely, if the frequency runs below its normal value the synchronous motor $f$ will lag behind the clock 19 and the revolving contact member 12 will not have passed by the contact member 13 before the clock actuated contact member 17 has engaged the contact member 16, thereby closing the circuit of the lamp 25. Thus, there will be a momentary passage of current through the circuit containing the lamp 25, which will be lighted and indicate to the operator that the frequency is low. The circuit through the lamp 25 may be traced as follows: from the line wire $a$ by wire 21, contact members 17, 16, wire 24, lamp 25, contact members 13, 12, and wire 20 to line wire $b$.

The duration of the flashes of the lamps 23, 25, indicate approximately the error in the phase relation of the synchronous motor and the accumulated error in the integrated frequency of the circuit. These lamps thus serve as a very definite guide for adjusting the speed of the turbines or engines which supply current to the circuit $a$, $b$.

A somewhat simpler form of the invention is shown in Fig. 2, where the clock sends out a single impulse at periodic intervals owing to the fact that the revolving contact member 17 cooperates with a single contact brush or member as 15, which is joined by the conductor 28 with the revolving contact member 12 of the synchronous motor $f$, and the conductors 22, 24, connected with the contact members 14, 13, and containing the lamps 23, 25, are joined by a common return 29 to the line wire $b$.

The impulse sent out by the clock passes through the conductor 28 to the revolving member 12 actuated by the motor $f$ and is normally timed to occur while the member 12 is between the contact brushes or members 13, 14. If the frequency of the circuit gains, the impulse will come when the circuit through contact member 14 is closed and will thus cause the lamp 23 to flash, and if the frequency runs slow or lags, the impulse will pass through the circuit containing the lamp 25, when the circuit is closed between the contact members 12, 13.

The circuit through the lamp 23 may be traced as follows: from line wire $a$ by wire 21 to contact member 17, thence by contact member 15, wire 28, to contact member 12, thence by contact member 14, wire 22, lamp 23, and wire 29 to line wire $b$.

The circuit through lamp 25 may be traced as follows: from line wire $a$, wire 21, contact members 17, 15, and wire 28 to contact member 12, thence by contact member 13, wire 24, lamp 25, and return wire 29 to line wire $b$.

It is not desired to limit the invention to the particular arrangements of circuits herein shown. In the present instance these circuits are shown as containing one form of device, which is actuated by the current flowing through the circuits, to wit:—lamps which serve to visually indicate the condition of the frequency, but it is not desired to limit the invention in this respect, as other forms of devices, such as bells or other signaling devices may be used instead of said lamps for indicating the condition of the frequency.

The brushes 14, 15, are connected by wire 22 in which is located a translating device 23, used for controlling the system or for indicating the frequency. In the present instance the translating device is shown as a signal lamp. In a similar fashion brushes 13 and 16 are connected by wire 24 in which is located the translating device 25, also shown as a signal lamp. It is evident that said devices 23 and 25 may take any well-known form for automatically performing a corrective act on the system to restore it to the desired average frequency. Throughout the following description the devices 23 and 25 will be referred to as lamps, but such a term is used merely in an illustrative and not in a limiting sense.

In the system herein shown, the devices in the circuits controlled by the clock and motor actuated contact members are illustrated as responsive to closure of said circuits but it is not desired to limit the invention in this respect, as said circuits may be arranged to have said devices respond to the opening of said circuits.

From the above description, it will be seen that an electric circuit is provided with a plurality of circuit controllers, one of which is operated by a synchronous motor and the other by a standard time keeper working in conjunction with the motor to periodically open and close the circuit.

The duration of contact between the brushes or members 15, 16, and the clock-actuated contact member 17 may be adjusted by the thumb-screws 32, 33, and between the brushes or members 13, 14, and the motor driven contact member 12 by the thumb-screws 34, 35.

Claims:

1. In an alternating current system, in combination, an alternating current circuit, a synchronous motor connected with said circuit, a circuit controller having a movable member actuated by said motor, a second circuit controller actuated by a standard time keeper, an electric circuit governed by said circuit controllers, and a device in the last mentioned circuit governed by said circuit controllers for indicating the accumulated error in the integrated frequency of the current in the alternating current circuit.

2. In an alternating current system, in combination, an alternating current circuit, a synchronous motor connected with said circuit, a circuit controller having a movable member actuated by said motor, a plurality of circuits governed in part by said movable member, a second circuit controller actuated by a standard time keeper and governing in part said plurality of circuits, and devices in said plurality of circuits governed by said circuit-controllers for indicating the accumulated errors in the integrated frequency of the alternating current.

3. In an alternating current system, in combination, an alternating current circuit, a synchronous motor connected therewith, a circuit controller actuated at frequent intervals by said synchronous motor, a second circuit controller actuated at frequent intervals by a standard time keeper, and an electric circuit connected with said alternating current circuit and governed by said circuit controllers.

4. Means for measuring the variation in frequency of an alternating current system comprising an electric translating device adapted to be operated whenever said frequency varies from normal value, a circuit for supplying said device with energy, a pair of contact devices in series in said circuit, one of said contact devices being periodically operated in synchronism with said system and the other being periodically operated by a standard chronometer, characterized by the fact that when said frequency is correct, said contact devices are synchronously closed during different time intervals and when said frequency varies from normal, said contact devices are closed at periodic intervals during the same time whereby current is periodically supplied to said translating device, the duration of said period being proportional to the variation from normal frequency.

5. In an electrical system, in combination, a synchronous motor, a circuit controller operated by said motor, an electric circuit governed in part by said motor-operated circuit controller to periodically open and close said electric circuit at one point, a second circuit controller governing in part said electric circuit, and means for operating said second circuit controller to periodically open and close said electric circuit at another point, the time during which said circuit is closed by both of said controllers being proportional to an error in the frequency of said system.

6. A device for regulating frequency of an alternating current consisting of a standard time keeper, means whereby said time keeper periodically closes an electric circuit, a synchronous motor driven by the alternating current, means whereby said motor periodically closes the electric circuit, interconnecting means including a signaling device between the circuit closing device of the time keeper and the circuit closing device of the motor whereby the extent of variation between the phase relations of the two contact makers will be indicated and thus enable the frequency of said alternating current to be regulated.

7. In an alternating current system, in combination, an electric circuit, a translating device in said circuit, means for periodically closing and opening said circuit, and means the speed of which depends upon the frequency of the system for closing and opening the circuit at another point, said two latter means being so arranged that the periodic duration of current flow through the translating device is dependent upon the variation of the frequency of the system from a predetermined constant value.

8. In an alternating current system, in combination, an electric circuit, a translating device in said circuit, means for periodically closing and opening said circuit, and a revolving switch arm the speed of which depends on the frequency of the system for closing and opening the circuit at another point, said arm being so arranged with respect to the first-named means that when the average frequency of the system varies from a definite value, the phase relation of the two periodic closures as well as the periodic duration of the current flowing through said translating device vary similarly.

9. In an alternating current system, in combination, a pair of electric circuits, a translating device in each of said circuits, means for periodically closing and opening said circuits, and means depending on the frequency of the system for closing and opening each of said circuits, said two latter means being so arranged that a reduction in average frequency causes a variation comparable with the amount of reduction of the average frequency, in the periodic duration of current flow through one of the translating devices, and an increase in the average frequency causes a variation comparable with the amount of increase in the average frequency in the periodic duration of current flow in the other translating device.

10. In an alternating current system, in combination, a pair of electric circuits, a translating device in each circuit, a revoluble contact arm driven at a constant rate for controlling the opening and closing of said two circuits, and another revoluble contact arm driven at a speed dependent on the frequency of the system for controlling the opening and closing of said two circuits, the relative position of said two arms when the frequency is at the desired value being such that the translating devices are not supplied with current during any portion of a period of rotation, and one or the other is supplied with current for a portion of the period of rotation when the frequency varies.

In testimony whereof, I have signed my name to this specification.

HENRY E. WARREN.